US006186524B1

United States Patent
McQueeny et al.

(10) Patent No.: US 6,186,524 B1
(45) Date of Patent: Feb. 13, 2001

(54) CHILDREN'S WAGON WITH IMPROVED BOLSTER

(75) Inventors: Thomas P. McQueeny, Chicago; Robert Pasin, Oak Park, both of IL (US); Brent Schrader, Clinton, IA (US); Frederick J. Michelau, Des Plaines, IL (US)

(73) Assignee: Radio Flyer, Inc., Chicago, IL (US)

( * ) Notice: Under 35 U.S.C. 154(b), the term of this patent shall be extended for 0 days.

(21) Appl. No.: 09/250,998

(22) Filed: Feb. 16, 1999

(51) Int. Cl.[7] .................................................... B62B 9/20
(52) U.S. Cl. .................. 280/87.021; 280/87.05; 280/432; 403/116
(58) Field of Search .................. 280/272, 432, 280/137.5, 137.502, 87.01, 87.021, 87.05, 47.34; 403/116, 117

(56) References Cited

U.S. PATENT DOCUMENTS

| | | |
|---|---|---|
| 1,689,682 | 10/1928 | Rainey . |
| 1,782,330 | 11/1930 | Werlich . |
| 2,531,933 * | 11/1950 | Clark ................. 280/87.021 |
| 2,565,848 | 8/1951 | Howard . |
| 2,759,298 | 8/1956 | Ystenes . |
| 3,069,182 * | 12/1962 | Hufford .................. 280/87.01 |
| 3,100,120 | 8/1963 | Cleary . |
| 3,236,539 | 2/1966 | Ketterer . |
| 3,556,559 * | 1/1971 | Interisano ................ 280/432 |
| 4,120,514 * | 10/1978 | Sanders .................. 280/432 |
| 4,204,700 * | 5/1980 | Haines, Sr. .............. 280/432 |
| 4,222,582 | 9/1980 | Tonelli et al. . |
| 4,744,575 | 5/1988 | Tonelli . |
| 5,730,454 * | 3/1998 | Dudzik et al. ........... 280/432 |

FOREIGN PATENT DOCUMENTS

| | | |
|---|---|---|
| 259009 | 6/1949 | (CH) . |
| 297 22 538 U | 2/1998 | (DE) . |
| 0 854 077 | 7/1998 | (EP) . |

* cited by examiner

Primary Examiner—Michael Mar
(74) Attorney, Agent, or Firm—Piper Marbury Rudnick & Wolfe (57) ABSTRACT

A children's wagon comprising a wagon body, a bottom wall, and front and rear bolsters secured to the bottom wall. The front bolster is pivotally secured to the bottom wall and a pin is associated with the bottom wall and is adapted to extend downwardly therefrom to interfere with the front bolster movement to thereby minimize the possibility of tipping of the wagon. The pin is adapted to be moved upwardly out of interfering position whereby the front bolster can be moved 180° in either direction to thereby place the wagon in more convenient positions for transportation and storage. The front and rear bolsters are each provided with shock absorbers positioned above the front and rear axles adjacent each of the wagon wheels. Slotted vertically extending extensions on each side of each bolster receive the wagon axles and provide for vertical movement of the bolsters relative to the axles. The bolsters move in opposition to springs which are located in surrounding relationship with the respective slotted extensions. A bellows is, in turn, positioned around each spring and upper and lower retainers are provided for engagement with the respective ends of the springs and bellows.

6 Claims, 12 Drawing Sheets

CHILDREN'S WAGON WITH IMPROVED BOLSTER

BACKGROUND OF THE INVENTION

This invention relates to a children's wagon of the type having front and rear bolsters for supporting wheels which permit movement of the wagon over the ground. In a typical wagon of this design, the rear bolster is held in a fixed position with a transverse axle associated with the bolster having outwardly extending ends for supporting the wheels. The front bolster is typically used for supporting a wagon handle and is pivotally mounted on the wagon so that wagon can be turned. Like the rear bolster, the front bolster will support an axle which in turn supports the front wheels.

For safety, it is preferred that the turning of the front bolster be limited. Thus, as described in U.S. Pat. No. 4,744,575, this will prevent tipping of the wagon under normal operating conditions and this feature has been recognized as most useful and desirable. The feature has a limitation, however, because the restriction on turning, can prevent the wagon from being positioned in a compact manner in some wagon designs, for example, when it is desired to place the wagon in a vehicle or when storing the wagon.

SUMMARY OF THE INVENTION

In accordance with this invention, a wagon with front and rear bolsters is provided with the desired anti-tipping safety feature while at the same time providing means for turning the wagon handle 180 degrees, in either direction, relative to the wagon body so that the wagon can be brought to a desired compact configuration for transporting and storing the wagon. These means comprise a pin stop which is mounted in the wagon body but is movable relative thereto. In one position of the stop, it extends into the path of the pivoting bolster to limit the turning so that the wagon will not have a tendency to tip during normal operation. In a second position of the stop, it will be out of the restraining position so that the bolster is completely free for turning movement. The wagon handle can then be located in the most convenient position for handling when not in use.

The wagon body is preferably molded of a suitable plastic material. The pin stop is located in an opening defined by the wagon body so that, with appropriate relative dimensions, it can be located in the respective first and second positions. In one form of the invention, the stop consists of a pin formed integrally with the bottom wall of the wagon and movable relative thereto by virtue of a living hinge attaching the pin to the wagon body. The use of the wagon is then able to move the pin out of an engaging position when it is desired to disable the anti-tipping feature as when transporting or storing the wagon.

In a second form of the invention, the stop is vertically movable in a passage defined by the wagon bottom wall. The stop is provided with ribs or the like which serve to accurately locate the stop as it is moved from one position to the other. By utilizing plastic material, a press fit relationship is achieved since the plastic will yield sufficiently to insure movement to the desired positions and temporary retention therein.

The bolster strictures of the invention are also characterized by a unique design. Specifically, a shock absorber arrangement is built into the bolsters which has advantages both from the standpoint of the ride provided by the wagon and from the standpoint of the appearance and sales appeal of the wagon.

The shock absorber arrangement is located at each wheel location. The shock absorbers are positioned interiorly of each wheel but are readily visible for maximum appeal. Each shock absorber includes an outer bellow surrounding an interior spring with the spring ends being received in upper and lower retainers. The spring fits around a tube which is mounted on the axle but which is capable of vertical movement relative thereto in response to weight introduced to the wagon body.

DESCRIPTION OF THE PREFERRED EMBODIMENTS

Figure 1:
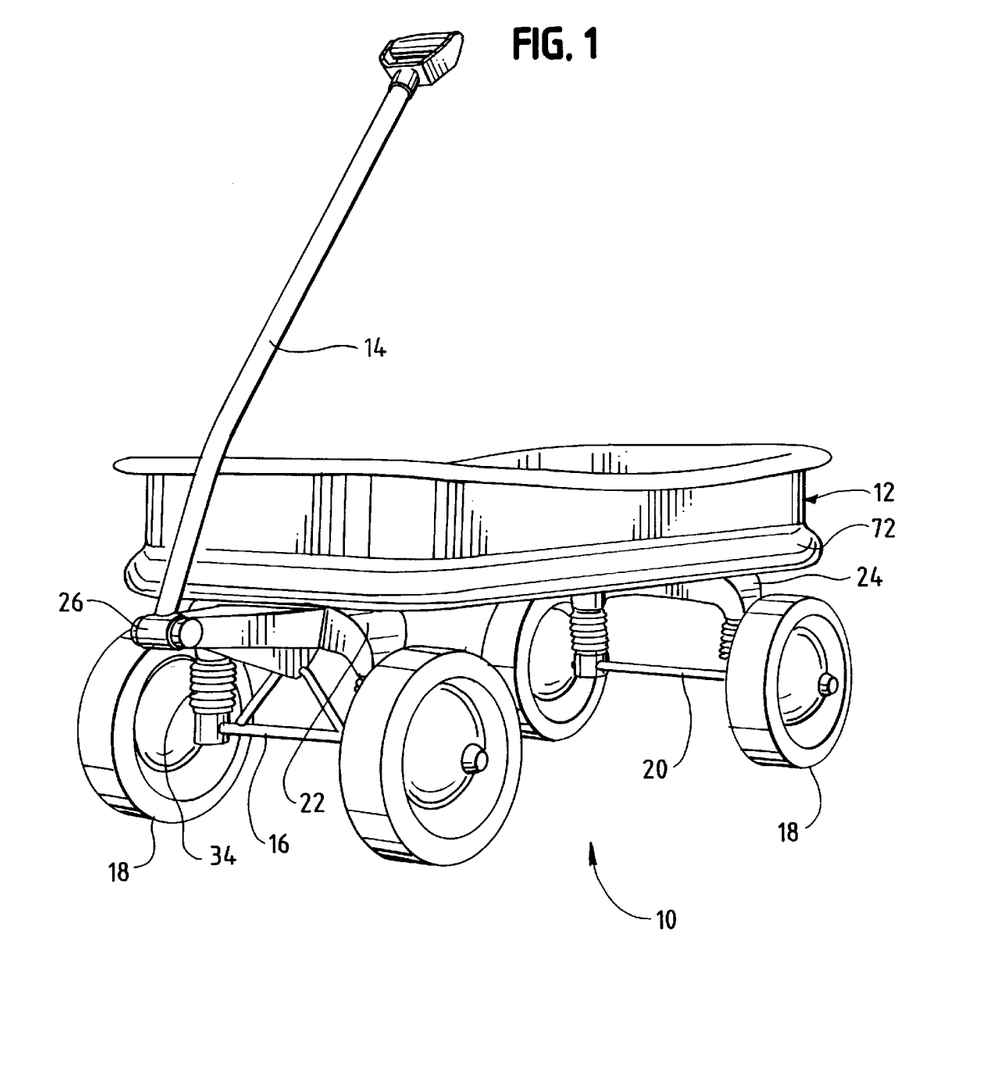
FIG. 1 is a perspective view of the improved wagon of this invention.

As shown in FIG. 1, the invention comprises a children's wagon 10 having a body 12 for supporting a rider or articles and a handle 14 for pulling and steering the wagon. Axle 16 supports front wheels 18 and axle 20 supports the rear wheels. A front bolster 22 is attached to the underside of the wagon body for supporting axle 16 and rear bolster 24 is attached for supporting rear axle 20. The front bolster also includes a forward extension 26 for pivotally supporting handle 14 as is conventional.

Figure 2:
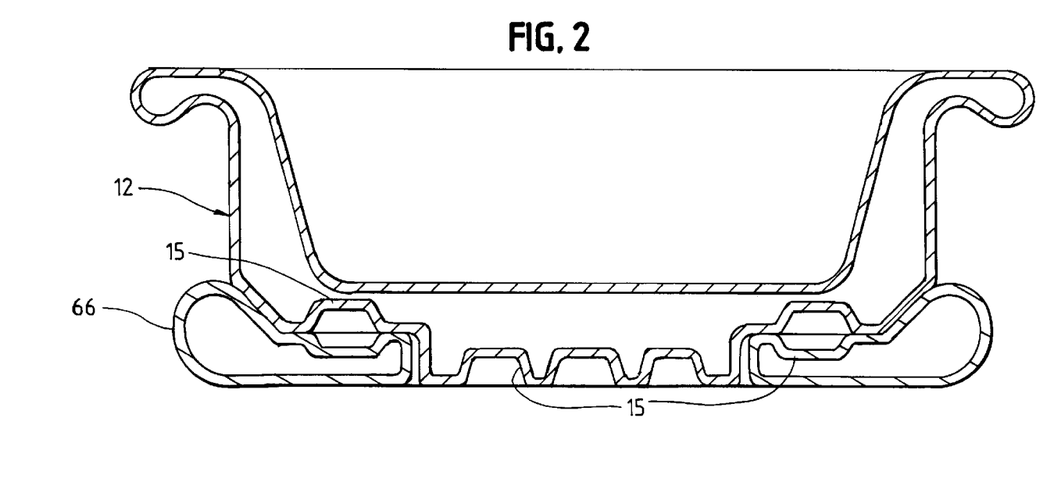
FIG. 2 is a cross-sectional view of the wagon body.

The wagon body and bolsters may be molded plastic parts formed, for example, of high density polyethylene. The body 12 may be hollow and shown in the cross sectional view of FIG. 2. Also as shown in this view, a separate trim panel 66 may be attached to the main body 12 by any conventional means. Both the wagon body and the trim panel may be provided with embossed strengthening ribs such as shown at 15.

Figure 3:
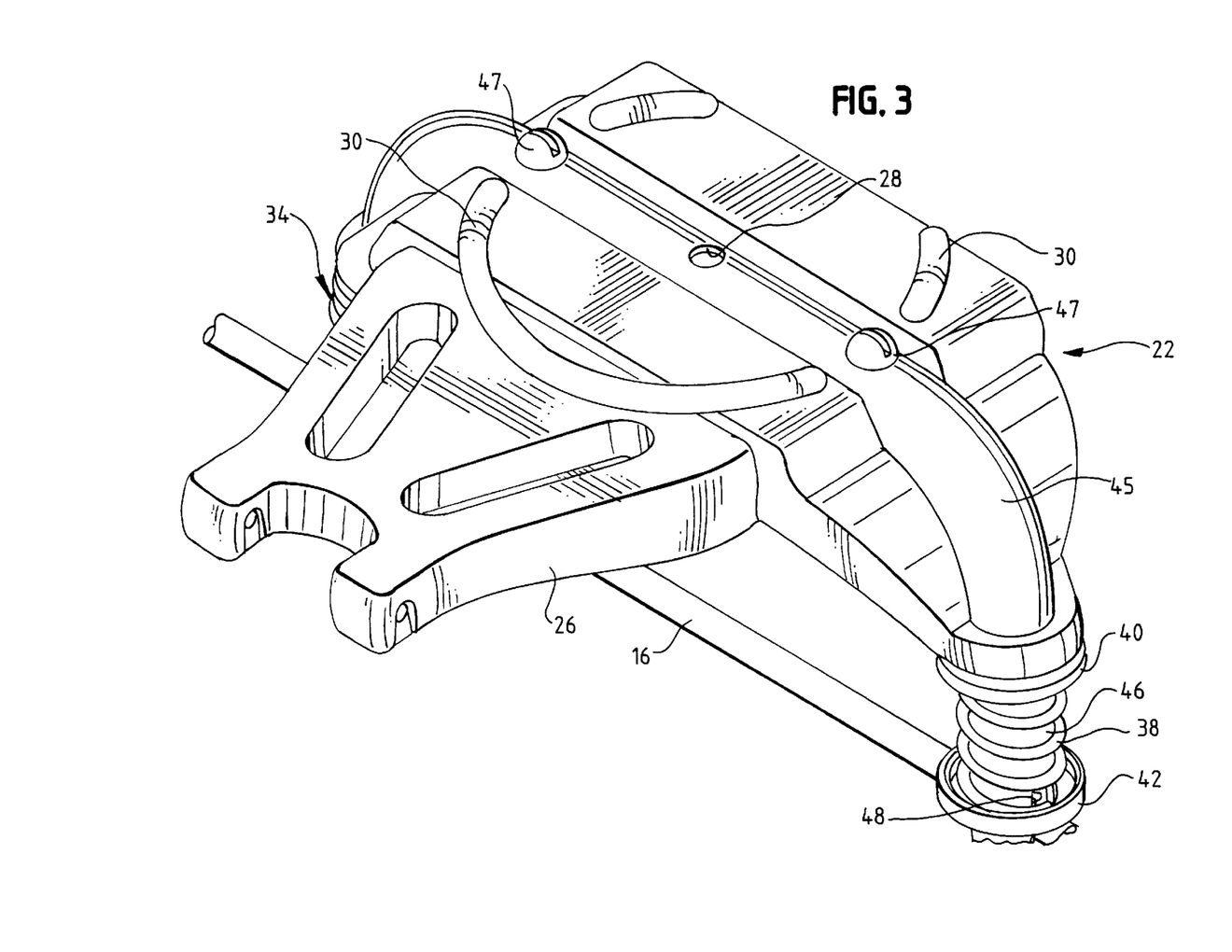
FIG. 3 is a perspective view of the front bolster utilized in the wagon.
Figure 4:
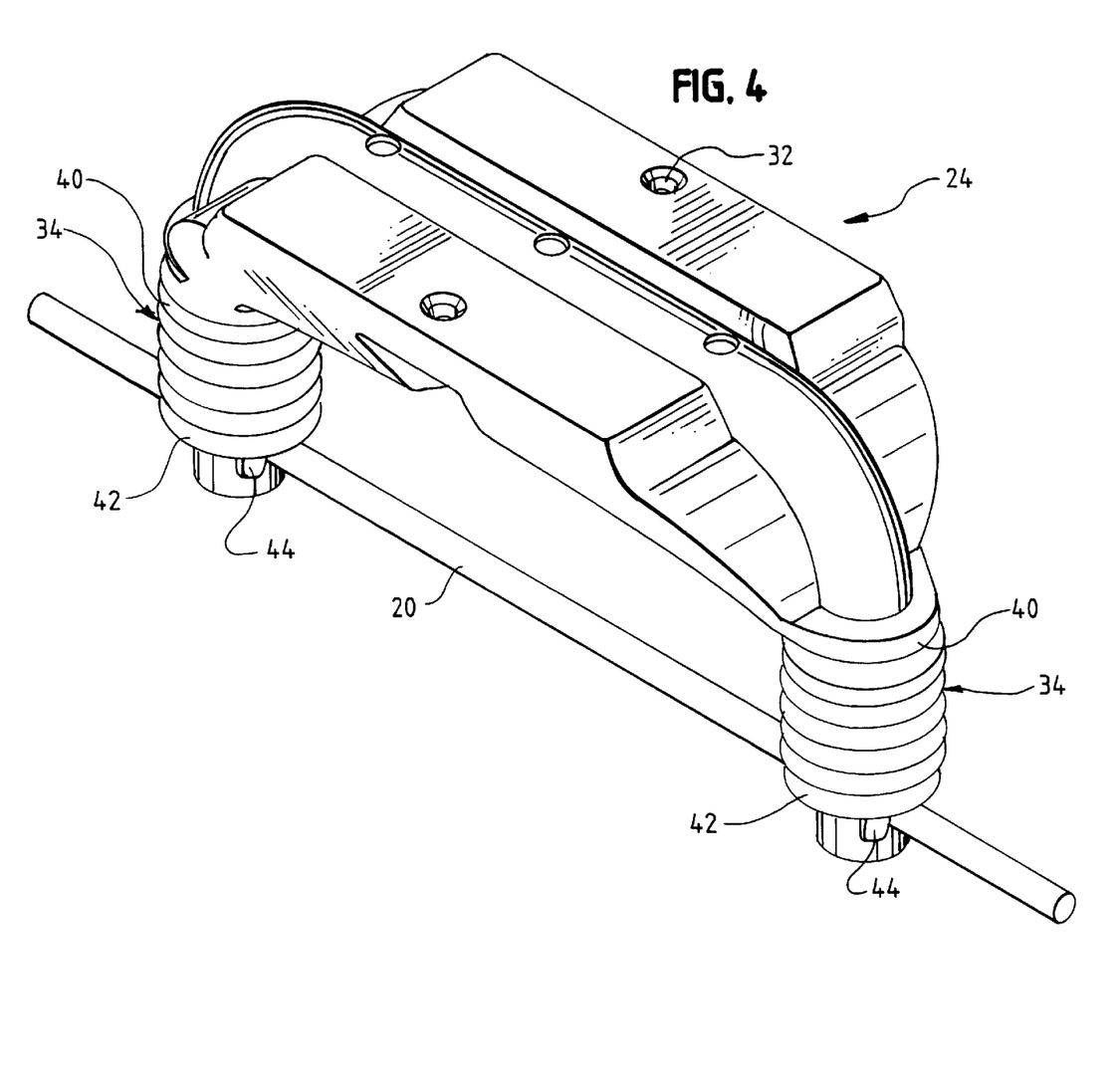
FIG. 4 is a perspective view of the rear bolster utilized in the wagon.
Figure 8:
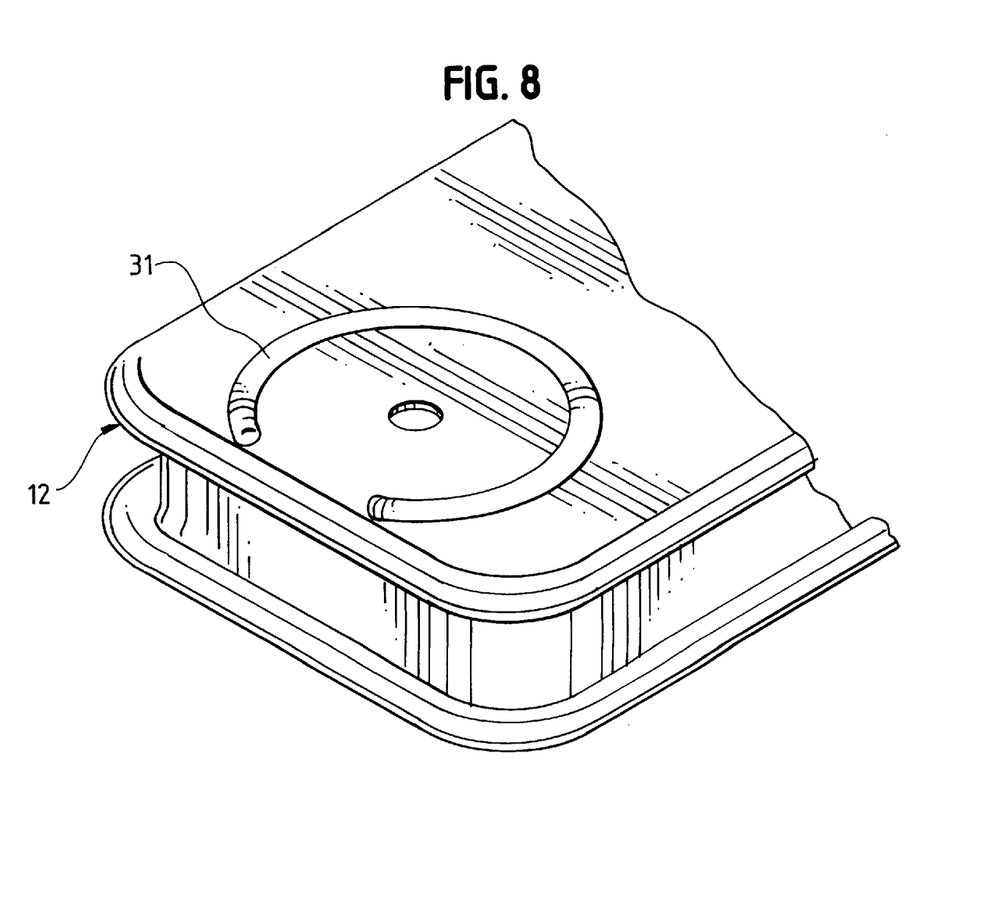
FIG. 8 is a fragmentary perspective bottom view illustrating grooves formed in the wagon bottom wall.
Figure 9:
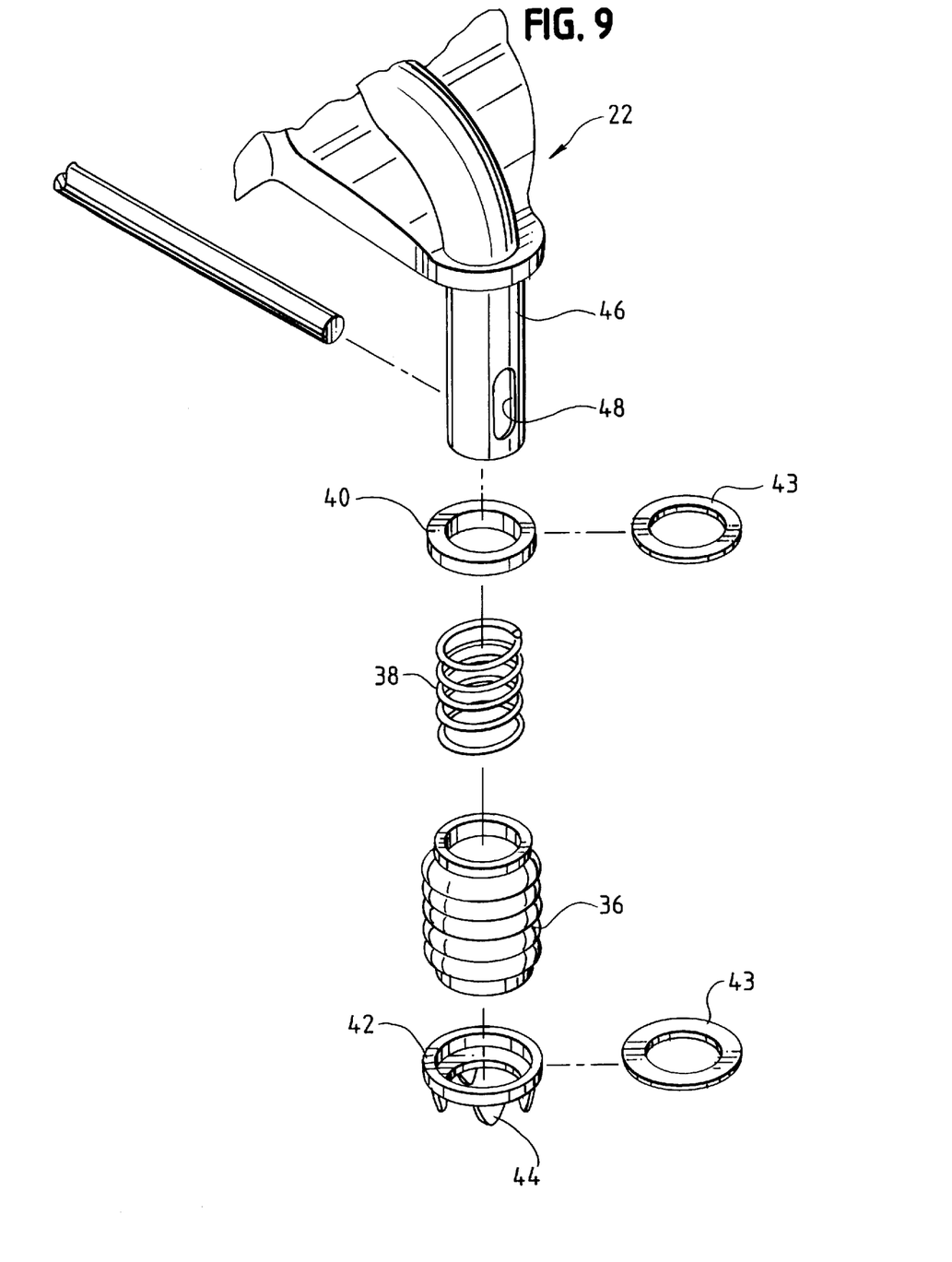
FIG. 9 is an exploded view of the parts which make up the shock absorber structure of the wagon.
Figure 10:
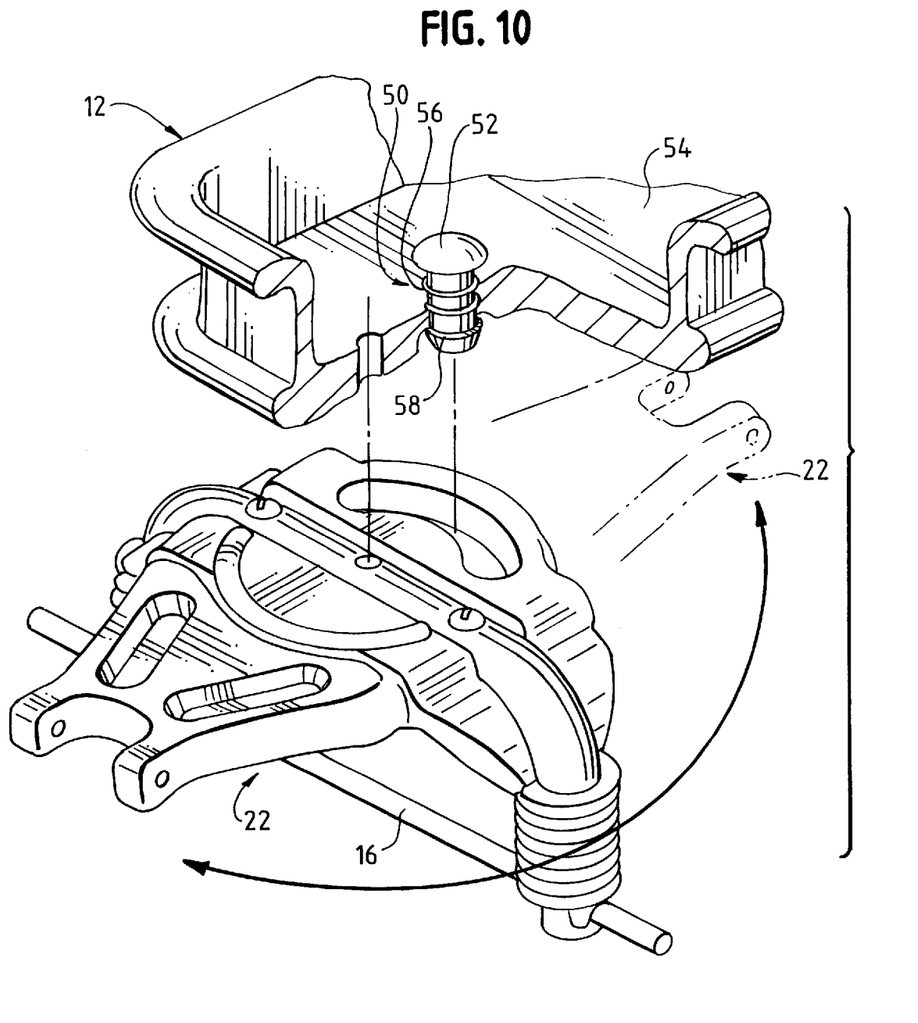
FIG. 10 is a perspective view illustrating an alternative form of bolster and stop pin, anti-tipping combination.

As shown in FIG. 3, the front bolster in accordance with one form of the invention defines an opening 28 for receiving a pivot pin of any conventional design for attaching the bolster to the wagon body while permitting pivoting and swiveling movement of the bolster. Beads 30 may be embossed on the top of the bolster for interfitting with corresponding depressions 31 (FIG. 8) in the wagon body for thereby insuring a smooth swiveling movement. As shown in FIG. 4, rear bolster 24 is of the same general form, however, in this case the openings 32 are provided for fasteners which fix the rear bolster in place relative to the wagon body.

Figure 5:
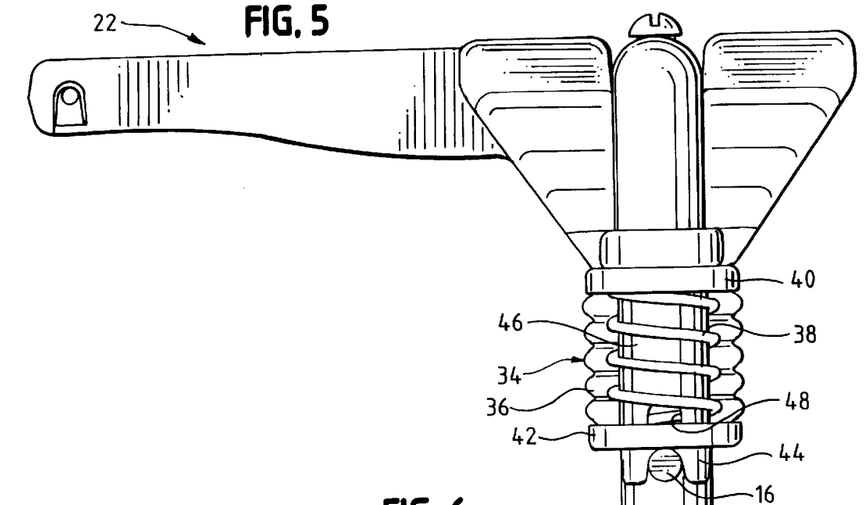
FIG. 5 is a side elevational view of the front bolster, partly cut away.

Each bolster is provided with a pair of shock absorbers 34. As shown in detail in FIGS. 3–5 and 9, this structure consists of an outer bellows 36 which is cylindrical in form and which is positioned in surrounding relationship with a spring 38. In FIGS. 3 and 5 the bellows has been removed to better illustrate the interior structure of the shock absorber.

An upper, cup-like, retainer 40 for the respective upper ends of a bellows and spring is located on each side of each bolster. A lower retainer 42 is also provided at each end of each bellows. These latter retainers define feet 44 which straddle the respective axle locations.

Each of the front and rear bolsters is preferably formed of two main parts consisting of a plastic molded body section and a U-shaped steel tube 45 attached to the body section by means of screw fasteners 47. Tubular extensions 46 comprising the respective legs of the U-shaped tubes 45 fit within the springs 38 and each extension defines a vertical slot 48 for receiving the respective ends of the axles so that the bolsters are free to move downwardly relative to the axles in opposition to the springs and in response to weight applied to the wagon.

As an option, the retainers 40 and 42 may be replaced with steel washers 43 for minimizing cost without unduly impairing the function of the bolsters.

The arrangement illustrated provides a unique wagon design both from the standpoint of function and appearance. Thus, the riding characteristics of the vehicle are improved while at the same time the wagon is more appealing to youngsters. This is all accomplished with an uncomplicated, easy-to-assemble, arrangement.

Figure 6:
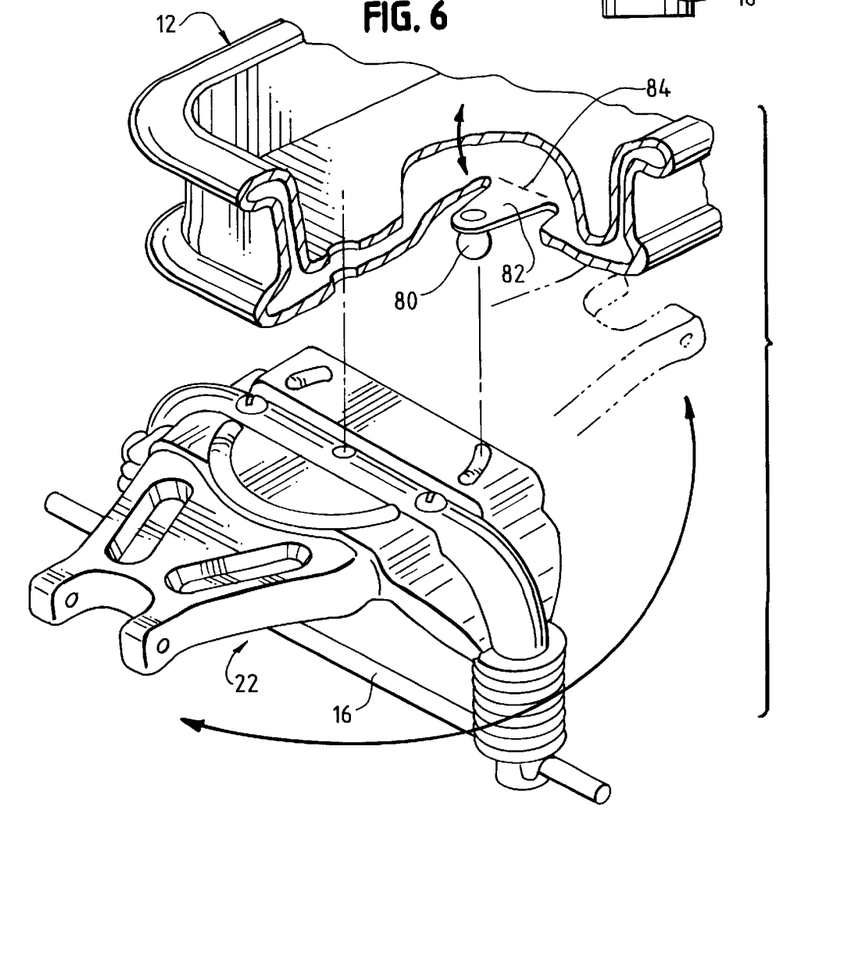
FIG. 6 is a fragmentary cut-away view of the wagon body illustrating one form of a stop pin, anti-tipping feature of the invention.
Figure 7:
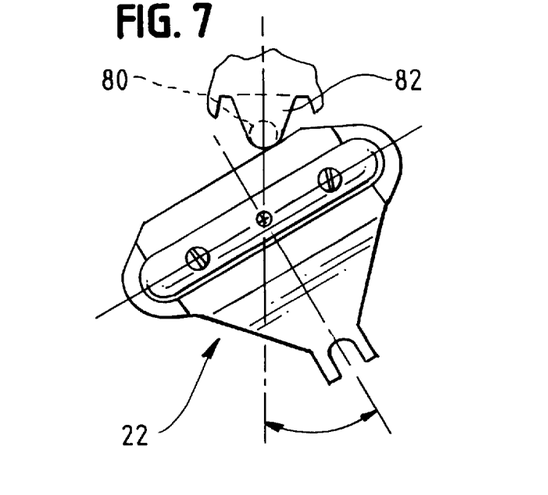
FIG. 7 is a schematic view illustrating the front bolster in engagement with the stop pin.

FIGS. 6 and 7 illustrate the interaction of the front bolster of FIG. 3 with the anti-tipping feature of this invention. In this case the anti-tipping feature is provided by means of a pin 80 and flap 82 molded integrally with the bottom wall of the wagon and connected thereto by means of a living hinge as shown at 84. This pin will normally extend downwardly from the bottom wall and thus interfere with the swiveling movement of the bolster as shown in FIG. 7. As explained in the aforementioned patent, this action minimizes the possibility of tipping under normal circumstances.

The wagon user can locate the pin out of the interfering position by pushing the pin upwardly. The front bolster 22 can then be swivelled freely, for example, to the position 180 degrees out of the normal operating position as shown in phantom in FIG. 6.

FIGS. 10–14 illustrate an alternative form for a stop pin serving to provide the anti-tipping feature. In this case, the feature involves the use of pin 50 which includes a head portion 52 accessible from floor 54 of the wagon. The cylindrical body of the pin defines a pair of ribs 56 which may be continuous or discontinuous. Beneath the ribs there is formed a shoulder 58.

An opening 60 is defined by the floor of the wagon for receiving pin 50. Since the wagon as well as the pin are formed of plastic, the pin is press fitted in the opening 60 and is thereby held in the respective positions shown to achieve the function called for. Specifically, when in the position shown in FIG. 14, the pin is in position to interfere with the swiveling movement of the front bolster. Because the turning of the front bolster is limited in this fashion, there is a resistance to tipping of the wagon which increases the safety of the wagon and facilitates the use of the wagon.

Figure 1A:
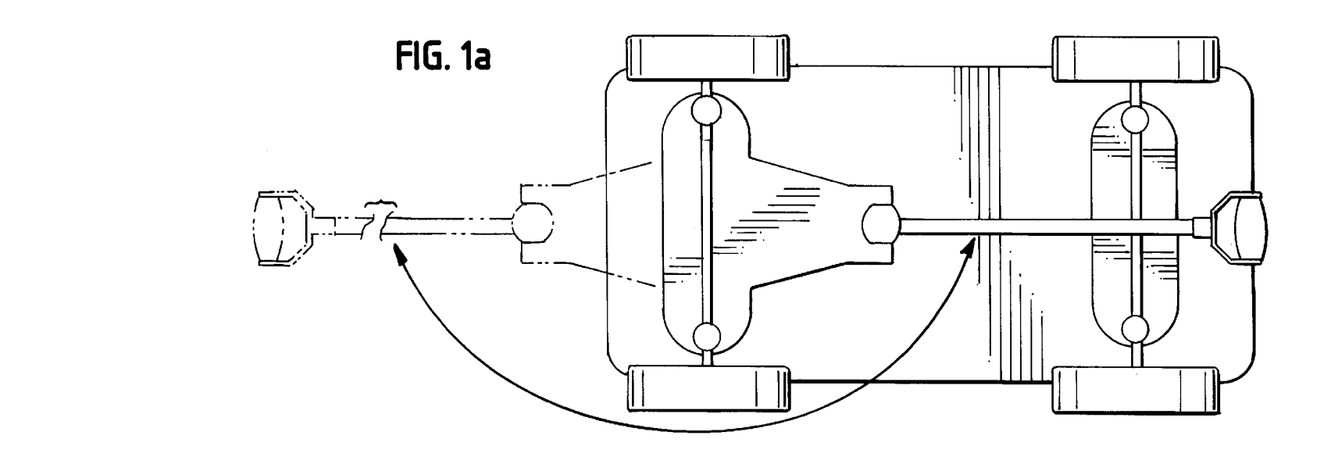
FIG. 1a is a bottom view of the wagon showing the handle in position for storage and transporting of the wagon.
Figure 13:
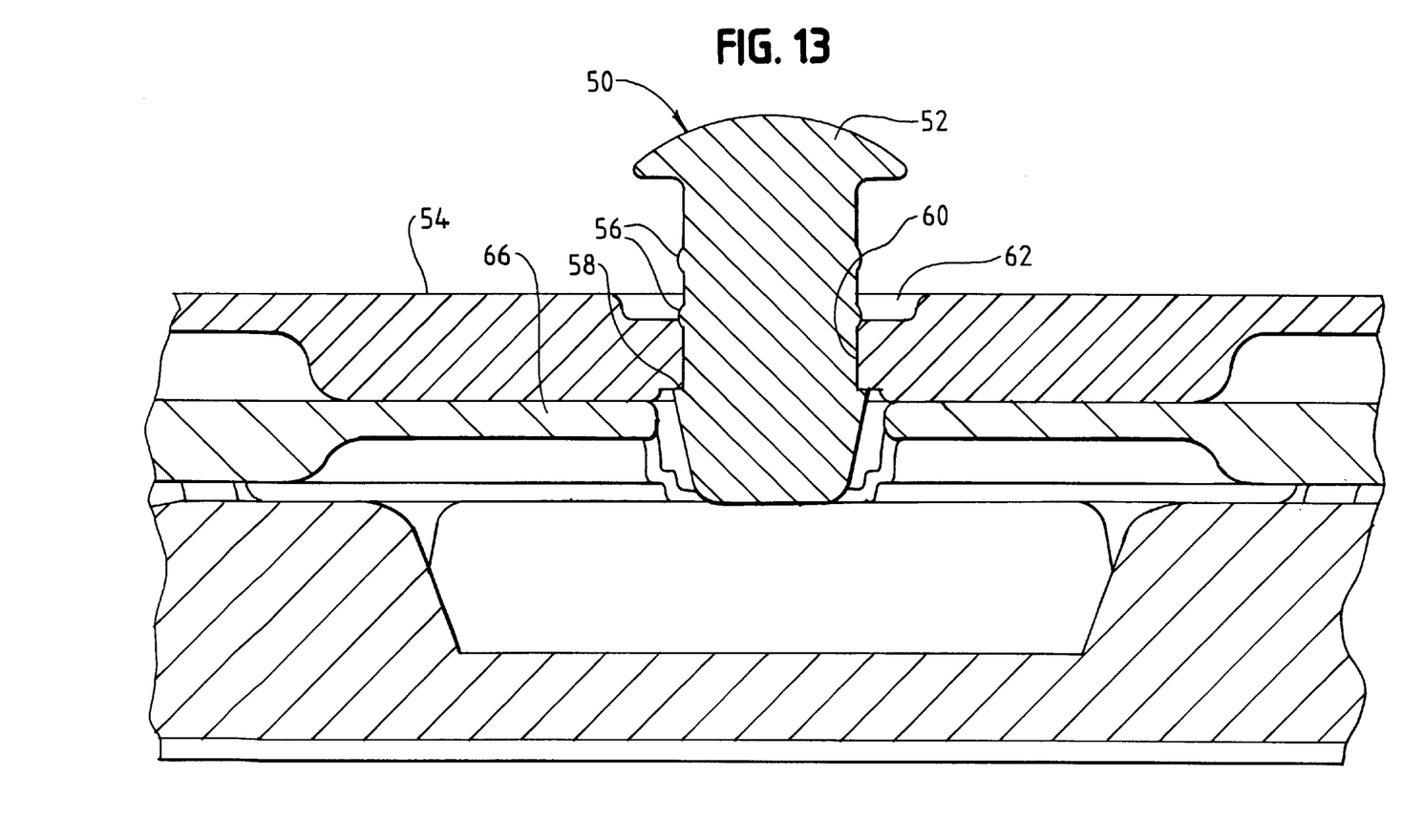
FIG. 13 is an enlarged, fragmentary cross sectional view showing the stop pin in the unlocked position; and, FIG. 14 is an enlarged, fragmentary cross sectional view showing the stop pin in the locked position.

When the pin 50 is moved to the position of FIG. 13, the front bolster 22 and handle 14 can be turned completely around as shown in FIG. 1a. Movement of the location of the handle 14 to this position, or to a variety of other available positions, makes the wagon design most convenient for transporting, storing or other handling the wagon.

As shown, the upper rib 56 is spaced apart from the underside of head 52 in accordance with the thickness of the wagon bottom wall 54 to facilitate positioning of the pin in the normal use location. Similarly, the lower rib 56 is spaced from the shoulder 58 to locate the pin in the upper position while the shoulder 58 also limits the upward movement of the pin so that there is no danger of the pin being entirely removed.

Figure 12:
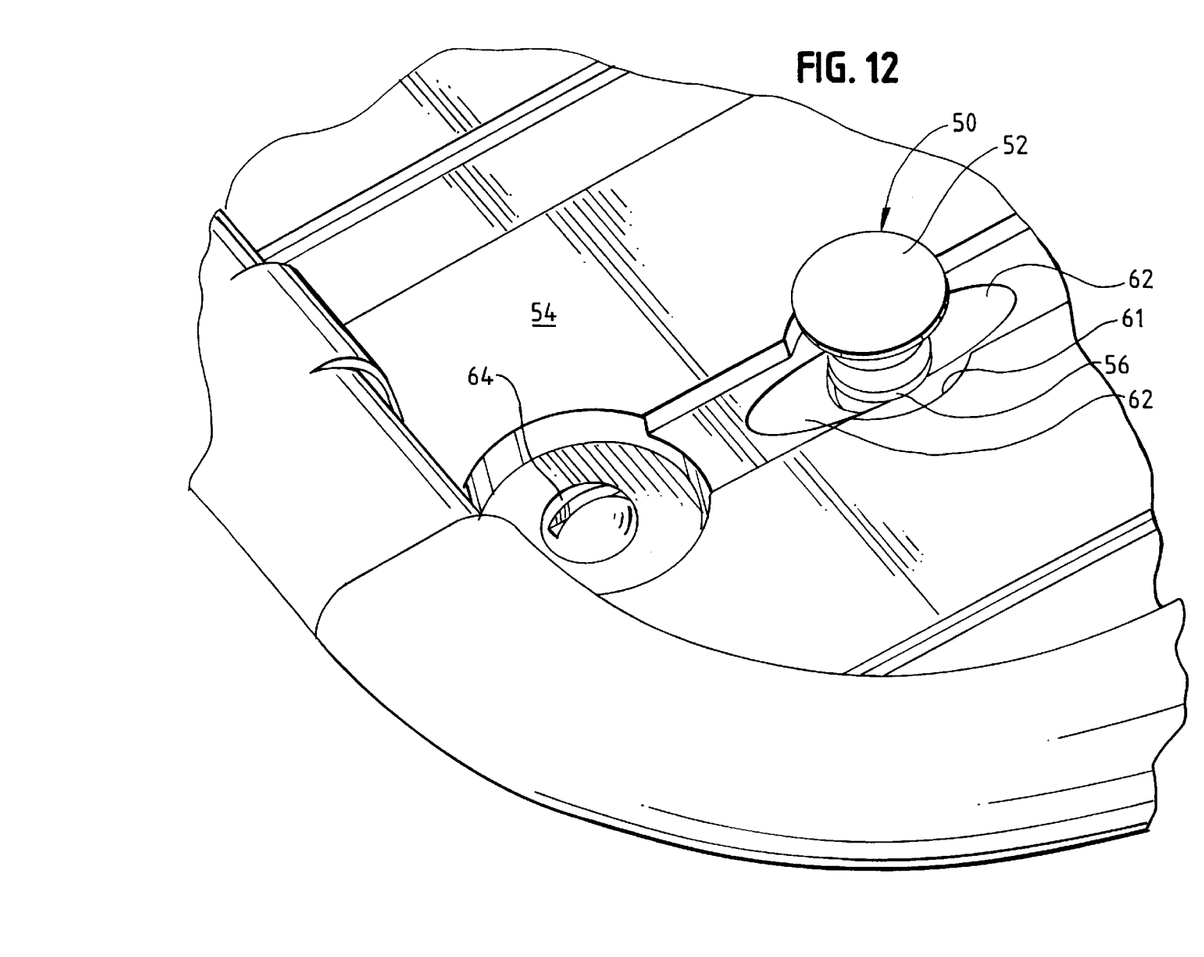
FIG. 12 is a fragmentary perspective view showing the stop pin from the top of the wagon.
Figure 14:
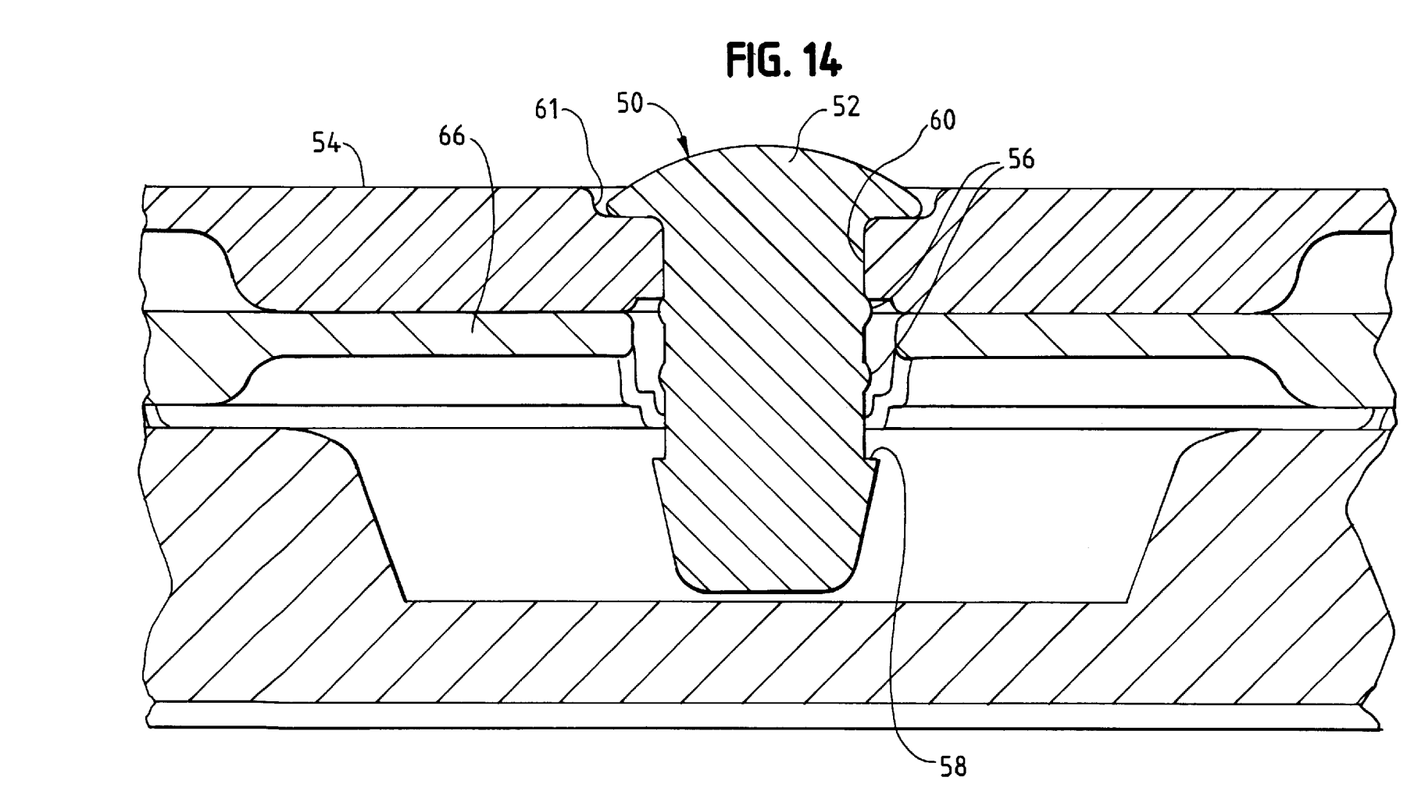

As shown in FIGS. 12–14, a depression 61 is provided in the wagon bottom wall so that the head 52 of pin 50 will not form an undesirably large bump in the bottom wall surface. Furthermore, extension 62 of the depression are deeper and thereby facilitate use of the fingers for gripping the pin 50 when raising it to the unlocked position. FIG. 12 also illustrates fastener head 64 which is part of the means used for pivotally supporting the front bolster as previously discussed.

Figure 11:
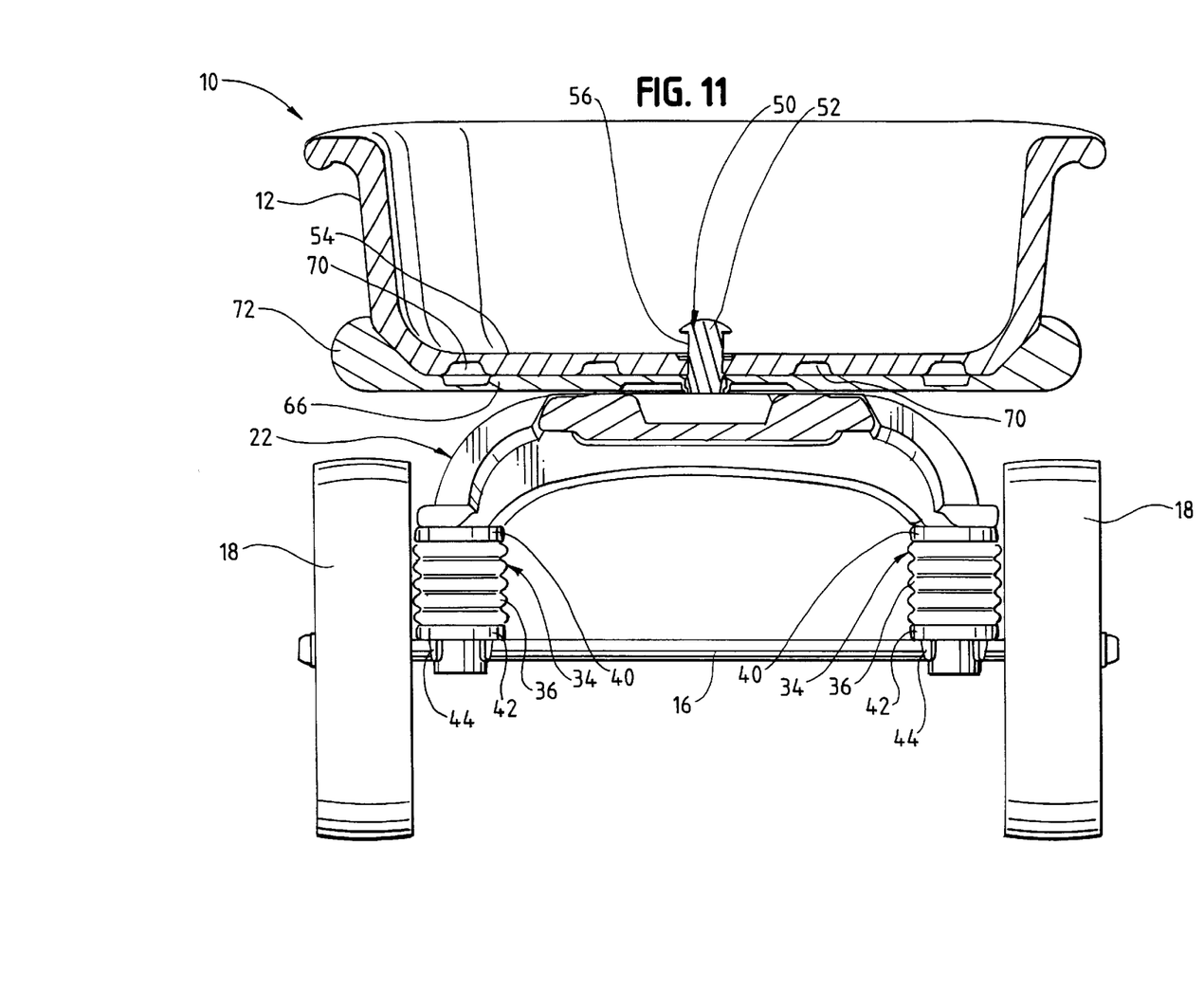
FIG. 11 is a vertical cross sectional view of the wagon illustrating an alternative stop pin, anti-tipping feature of the invention.

FIGS. 11, 13 and 14 illustrate the trim panel 66 underlying the bottom wall or floor 54 of the wagon. This is a separately molded part connected by means of any suitable technique such as sonic welding at locations 70. The part has a "bulbous" outer periphery 72 the lower rim design which is shown in FIG. 1.

It will be understood that various changes and modifications may be made in the subject matter of the invention without departing from the spirit of the invention particularly as defined in the following claims.

That which is claimed is:

1. A children's wagon comprising a wagon body defining a bottom wall for supporting a child or articles in the wagon, a rear bolster supported in a fixed position beneath said bottom wall, a rear axle attached to the rear bolster, rear wheels supported on the rear axle, a front bolster, a wagon handle attached to the front bolster, a front axle attached to the front bolster, front wheels supported on the front axle, and means pivotally connecting said front bolster beneath said bottom wall, an opening defined by said bottom wall, a vertically movable pin received in said opening and moveable between a first position with a lower end portion extending beneath said bottom wall into an elongated opening formed in the front bolster, the pin adapted to abut opposed ends of the elongated opening for limiting pivotal movement of the front bolster relative to said bottom wall and a second position with the lower end portion raised out of said elongated opening for permitting unlimited pivotal movement of said front bolster relative to said bottom wall, said pin having a head portion protruding above an upper surface of the bottom wall, said head portion adapted to be grasped by a user for moving said pin between said first and second positions, said pin being configured for locking engagement with said opening in said bottom wall while in said first and second positions, whereby said front bolster and handle are adapted to be pivoted to a position extending beneath said bottom wall for storage and handling of the wagon when the pin is in said second position, said wagon being resistant to tipping when said pin is in said first position.

2. A wagon in accordance with claim 1 including embossments defined by said front bolster on a topside thereof and corresponding embossments defined by said bottom wall, the respective embossments interfitting for confining the movement of the front bolster relative to the bottom wall.

3. A wagon in accordance with claim 1 wherein said front bolster is free for turning through 360° relative to said bottom wall.

4. A wagon in accordance with claim 1 wherein said pin and said wagon bottom all are formed of plastic, and including spaced apart circumferential ribs formed on the exterior of said pin for engagement with the interior surface of said opening, said ribs being yieldable relative to said interior surface to facilitate locating said pin in said first and second positions.

5. A wagon in accordance with claim 1 including a depression in said bottom wall extending outwardly from said opening beyond the position of whereby the protrusion of said head portion above the upper surface of the bottom wall is minimized when the pin is in said first position and whereby space is provided for insertion of the fingers of the user to grip the head portion for movement to the second position.

6. A wagon in accordance with claim 1 wherein said pin is located rearwardly of the pivot axis of said front bolster.

* * * * *